United States Patent Office 3,142,469
Patented July 28, 1964

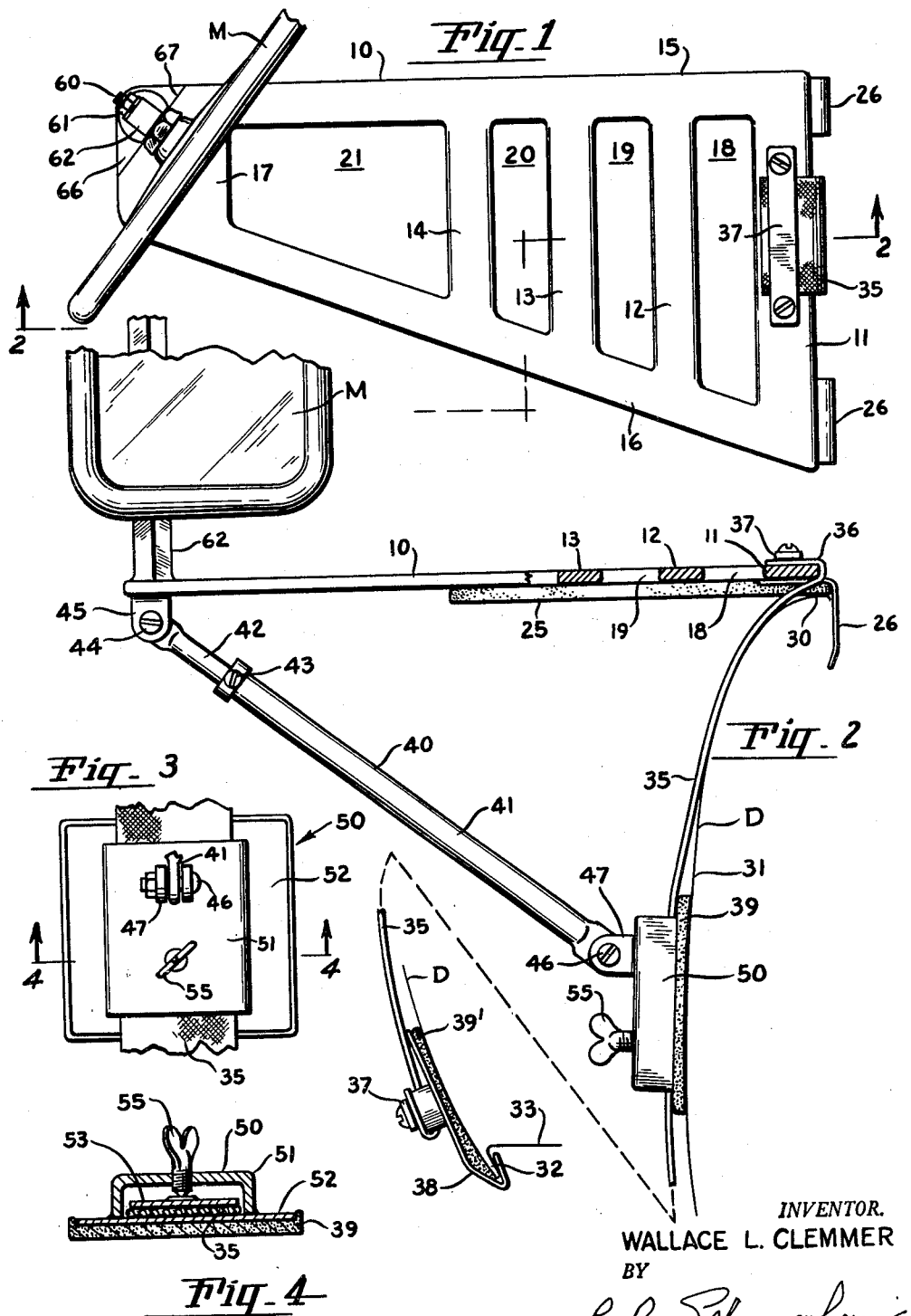

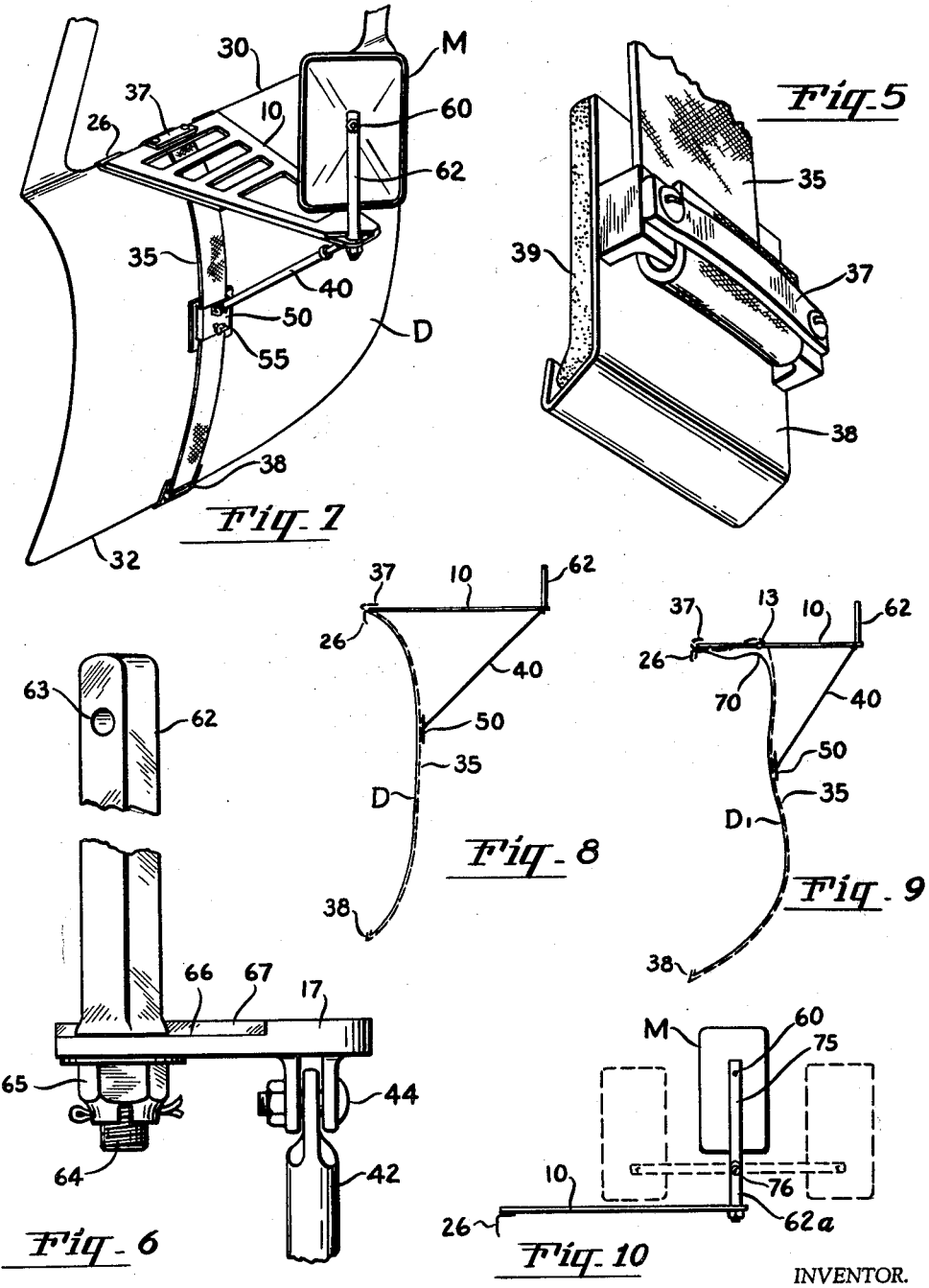

3,142,469
DETACHABLE REAR VIEW MIRROR
Wallace Le Roy Clemmer, St. Helens, Oreg., assignor of one-half to John L. Schwabe, Portland, Oreg., and one-half to John L. Mikesh and Bernice E. Mikesh, Scappoose, Oreg.
Filed Feb. 4, 1963, Ser. No. 255,931
7 Claims. (Cl. 248—226)

This invention relates to improvements in detachable rear view mirrors for automobiles.

Various types of rear view mirrors have heretofore been proposed. There remains, however, a particular need for a long arm outrigger-type of mirror which may be readily mounted on a passenger car or pickup truck for the occasional towing of trailers such as house trailers and boat trailers. Conventional passenger car mirror arrangements do not afford a view around a trailer which is wider than the towing vehicle whereby the driver cannot observe the traffic behind him. A truck-type mirror is needed but conventional truck mirrors are not suitable because they cannot be readily detached and would be in the way when the car is driven in normal use without a trailer. Also, truck-type mirrors are permanently bolted to the vehicle in such a manner as to deface and mar the appearance of the vehicle when removed.

The objects of the invention are, therefore, to provide a detachable truck-type rear view mirror particularly for use on passenger cars and pickup trucks, to provide a detachable side mounted mirror supported on an outrigger arm and to provide a device of the type described which is of relatively simple and economical construction, which has a sturdy and relatively rigid mounting arrangement on convertible as well as sedan-type automobiles, which can be readily attached and detached from the automobile and which will not mar the automobile.

The present detachable mounting arrangement consists essentially of three parts: a rigid outrigger arm, a rigid strut or brace and a strap for attachment to one of the front doors of the automobile. The inner end of the outrigger arm is equipped with fingers which project down into the window slot of the door. A strap from the inner end of the outrigger arm is hooked under the bottom edge of the door under sufficient tension to hold the parts in place. The outer end of the outrigger arm is supported by the strut, the lower end of which is connected with a mid-portion of the strap so as to bear against the door. By such means the device may be readily mounted and removed without the drilling of holes or the attachment of mounting brackets or other fixtures which would mar the automobile.

The invention will be better understood and additional objects and advantages will become apparent from the following description of a preferred embodiment of the invention illustrated in the accompanying drawings. Various changes may be made, however, in the details of construction and arrangement of parts, and all such modifications within the scope of the appended claims are included in the invention.

In the drawings:

FIGURE 1 is a top plan view of a rear view mirror embodying the principles of the invention;

FIGURE 2 is a rear elevation view in partial section taken on the line 2—2 of FIGURE 1;

FIGURE 3 is an elevational view of the strut clamp;

FIGURE 4 is a sectional view taken on the line 4—4 of FIGURE 3;

FIGURE 5 is an enlarged perspective view of the door hook on the lower end of the strap;

FIGURE 6 is an elevation view of the outrigger arm with the mirror removed and parts broken away;

FIGURE 7 is a perspective view showing the mirror mounted on an automobile door;

FIGURE 8 is a diagrammatic view showing the mounting arrangement on an automobile door of conventional contour;

FIGURE 9 is a similar view showing a different mounting arrangement on a door of different contour; and FIGURE 10 is a view showing a modified mirror mounting on the outrigger arm.

Referring first to FIGURES 1 and 2, the outrigger arm 10 preferably comprises a rigid flat plate having an inner transverse bar 11 and a plurality of intermediate transverse bars 12, 13 and 14 extending between a front longitudinal bar 15 and a rear longitudinal bar 16. Preferably, the end bar 11 makes a right angle with front bar 15 while the rear bar 16 converges toward the outer end of front bar 15 to make the plate generally triangular in shape. A conventional truck-type mirror M is mounted on the apex portion 17 of the triangle. This arrangement leaves openings at 18, 19, 20 and 21.

The under sides of the inner ends of bars 15 and 16 are padded with suitable cushion material 25. The inner end of each bar 15 and 16 is equipped with a depending spring finger 26 to be inserted in the window slot of the door D of the automobile. Such doors are normally characterized by a straight and horizontal top edge 30, the inner margin of which defines the outside of the window slot. Top edge 30 may also be designated as a window ledge or window sill. The fingers 26 are disposed outside of the window glass whereby the window may be raised and lowered without interference from these fingers. The door is further characterized by an outward bulge 31 at about mid-height and a bottom drip edge 32 which forms a downwardly projecting flange on the outside portion of the lower edge 33 of the door.

The foregoing features of a conventional automobile door are utilized to support and stabilize the outrigger arm 10. For this purpose a strap 35 has its upper end 36 bent around the inside edge of bar 11 and secured on the top side of this bar by a clamp plate 37. The lower end of strap 35 is similarly connected with a hook 38 which engages under the door flange 32. This hook is lined with suitable cushion or padding material 39' to avoid marring the outside of the door.

The outer end of outrigger arm 10 is supported by an adjustable strut 40. This strut comprises a tubular member 41 containing a telescopic extension rod 42. Length adjustment is obtained by means of a setscrew 43 in the upper end of tube 41. The upper end of rod 42 is pivotally connected at 44 with a bifurcated bracket 45 which projects from the under side of the end portion 17 of the arm 10.

The lower end of tubular member 41 is similarly pivotally connected at 46 with a bracket 47 on a belt clamp 50. The inner face of this clamp is equipped with a layer of padding or cushion material 39 which bears against the bulge portion 31 of the door. The clamp 50 comprises a channel member 51 which is connected at its edges with a backing plate 52. Strap 35 passes between backing plate 52 and a clamp plate 53. By tightening the thumbscrew 55 the clamp is attached to the strap and supported thereby to provide a fixed point of support for the lower end of strut 40.

The mirror mounting on the outrigger arm is best shown in FIGURE 6. Truck-type mirrors which are preferred for the present purpose are supported by a single threaded stud 60 projecting from the center of back of the mirror as shown in FIGURES 1 and 7. This stud may be rigidly mounted in an apertured support by tightening the nut 61. Vertical post 62 in FIGURE 6 is equipped with a round hole 63 to receive the stud 60. Post 62 has a stud 64 on its lower end which projects through a hole in the end portion 17 of the outrigger arm 10. This post is secured by a nut 65. Preferably, the end portion 17 is reduced in thickness at 66 leaving a vertical wall portion at 67. At least the lower end of post 62 is square in cross section and positioned close to the wall 67 to prevent the post from rotating. Suitable angular adjustment of the mirror is obtained by a frictional universal joint incorporated in the mirror itself whereby the mirror is capable of limited movement on its mounting stud 60 in order to give the driver the desired view to the rear.

FIGURE 8 is a diagrammatic view of the mounting arrangement just described on the door D where the strap 35 follows the contour of the door from top to bottom. The outrigger arm 10 is also constructed to provide a different arrangement of the strap 35 for certain doors $D_1$ having a different contour as shown in FIGURE 9. In this case the raised edge 70 outward from the window slot might provide a fulcrum for the weight of mirror M, particularly under conditions of vibration, which would tend to raise the fingers 26 and disengage them from the window slot. If this should happen, the whole apparatus would fall to the ground because its support depends upon the grip of fingers 26 in the window slot.

With such doors it is therefore desirable to hold the outrigger arm down at an intermediate point. This is accomplished by changing the direction of the strap. In such case the strap 35 is folded back across the top of the outrigger arm and passed down through one of the openings 18, 19, 20 or 21 so that the strap will pull directly downward on the bar 12, 13 or 14 around which it is trained. This arrangement prevents uplift of the inner end of the outrigger arm which would disengage fingers 26 from the window slot and makes the device readily adaptable to all conventional shapes of car doors.

FIGURE 10 shows a modified mounting arrangement for the mirror on outrigger arm 10. In this case a shorter post 62a is employed and the mirror stud 60 is mounted on an extension arm 75. Arm 75 is pivotally connected at 76 with the post 62a so that it may be adjusted to different positions, as shown. When arm 75 is swung out to horizontal position, the mirror will be placed beyond the extremity of outrigger arm 10. Arm 75 may also be swung inwardly to horizontal position when desired or set in a vertical position.

The strap 35 is preferably made of a stout elastic material. An elastic orthopedic truss strap serves the purpose very well and it may be sprayed with waterproofing material if desired. It is also possible to make the strap 35 of flexible inelastic material, if desired, but in such case the hook 38 should include suitable adjustment means to tighten the strap and make it snug on the door. Such adjustment would have to be not only a tightening adjustment but also a length adjustment to fit different makes and types of automobiles. The device is considerably simplified, however, by making the strap elastic as shown. When it wears out it is readily replaceable with a new strap.

The present mounting arrangement is very convenient to attach to and remove from an automobile door and does not mar the car in any way. It may be mounted on convertible-type automobiles as well as sedan, station wagon and pickup truck types. The braced outrigger arm provides very rugged and rigid support for an adequately large mirror mounted out sufficiently far to provide good visibility around a wide load. The supporting structure is not affected by vibration or wind pressure. A construction is illustrated for a left front door. A similar construction is used for a right front door to provide complete visibility to the rear.

Having now described my invention and in what manner the same may be used, what I claim as new and desire to protect by Letters Patent is:

1. A detachable rear view mirror device for automobiles comprising an outrigger arm having an inner end adapted to rest on the window ledge of an automobile door, a depending flexible finger on said inner end arranged for insertion in the window slot of the door, a strap having an upper end secured to the inner end of said arm, a hook on a lower end of said strap arranged to engage under the bottom edge of the door, a mirror on the outer end of said arm, and a strut having an upper end connected with the outer end of said arm and a lower end connected with an intermediate portion of said strap.

2. The device of claim 1, the lower end connection of said strut comprising a clamp on said strap and a pad on said clamp to bear against the door.

3. The device of claim 2, said strut comprising a pair of telescopic members having length adjustment and said upper and lower end connections comprising pivotal joints.

4. The device of claim 1, said arm comprising front and rear bars diverging toward the inner end of the arm and each of said bars having a depending flexible finger thereon.

5. The device of claim 4, including a bar interconnecting the divergent inner ends of said front and rear bars, and a bar interconnecting intermediate portions of said front and rear bars to provide a bearing edge for said strap.

6. The device of claim 1, said strap being elastic.

7. A detachable rear view mirror device for automobiles comprising an outrigger arm having front and rear bars divergent toward the inner end of the arm, a plurality of bars interconnecting said front and rear bars, depending spring fingers on the inner ends of said front and rear bars, an elastic strap having an upper end connected to one of said interconnecting bars, a hook on the lower end of said strap, an adjustable length strut pivotally connected at its upper end to the outer end of said arm, a clamp on said strap pivotally connected to the lower end of said strut, a post on the outer end of said arm, and a mirror on said post.

References Cited in the file of this patent

UNITED STATES PATENTS

| | | |
|---|---|---|
| 1,174,755 | Mullen | Mar. 7, 1916 |
| 2,969,715 | Mosby | Jan. 31, 1961 |
| 3,114,530 | Shilling | Dec. 17, 1963 |